US007747102B2

(12) United States Patent
New et al.

(10) Patent No.: US 7,747,102 B2
(45) Date of Patent: Jun. 29, 2010

(54) OPTICAL CORRELATOR

(75) Inventors: Nicholas James New, Wakefield (GB); Timothy David Wilkinson, Cambridge (GB)

(73) Assignee: Cambridge Correlators Limited, Wakefield (GB)

( * ) Notice: Subject to any disclaimer, the term of this patent is extended or adjusted under 35 U.S.C. 154(b) by 1059 days.

(21) Appl. No.: 10/528,533

(22) PCT Filed: Sep. 11, 2003

(86) PCT No.: PCT/GB03/03920

§ 371 (c)(1), (2), (4) Date: Oct. 11, 2005

(87) PCT Pub. No.: WO2004/029746

PCT Pub. Date: Apr. 8, 2004

(65) Prior Publication Data

US 2006/0050986 A1 Mar. 9, 2006

(30) Foreign Application Priority Data

Sep. 27, 2002 (GB) ................................ 0222511.8

(51) Int. Cl.

| | |
|---|---|
| *G06K 9/64* | (2006.01) |
| *G02B 13/16* | (2006.01) |
| *G02B 5/18* | (2006.01) |
| *G02B 27/42* | (2006.01) |
| *H04N 5/225* | (2006.01) |
| *G02F 1/03* | (2006.01) |
| *G02F 1/07* | (2006.01) |
| *G02F 1/33* | (2006.01) |
| *G06E 3/00* | (2006.01) |

(52) U.S. Cl. ...................... 382/278; 348/335; 359/249; 359/306; 359/558; 708/816

(58) Field of Classification Search ................ 359/249, 359/306, 558; 708/816

See application file for complete search history.

(56) References Cited

U.S. PATENT DOCUMENTS

| | | | | |
|---|---|---|---|---|
| 5,040,140 | A | 8/1991 | Horner | |
| 5,511,019 | A | 4/1996 | Grycewicz et al. | |
| 5,987,188 | A | 11/1999 | Freyre | |
| 6,247,037 | B1 | 6/2001 | O'Callaghan | |
| 6,369,933 | B1 | 4/2002 | O'Callaghan | |
| 2001/0007592 | A1 * | 7/2001 | Pu et al. | 382/116 |
| 2001/0019130 | A1 * | 9/2001 | Yamazaki et al. | 257/72 |
| 2001/0050366 | A1 * | 12/2001 | Okuyama | 257/72 |
| 2002/0011554 | A1 * | 1/2002 | Brehmer et al. | 250/208.1 |

FOREIGN PATENT DOCUMENTS

| | | |
|---|---|---|
| WO | WO 99/31563 | 6/1999 |
| WO | WO 9931563 A1 * | 6/1999 |

* cited by examiner

*Primary Examiner*—Matthew C Bella
*Assistant Examiner*—Nathan Bloom
(74) *Attorney, Agent, or Firm*—Hamilton, Brook, Smith & Reynolds, P.C.

(57) ABSTRACT

An optical correlator includes an image production device and an image capture device disposed in a common plane. An optical device such as a lens or mirror provides a Fourier transform of image information from the image production device onto the image capture device. An advantage of embodiments of the invention is its small size.

18 Claims, 6 Drawing Sheets

OPTICAL CORRELATOR

RELATED APPLICATIONS

This application is the U.S. National Stage of International Application No. PCT/GB2003/003920, filed Sep. 11, 2003, published in English, and claims priority under 35 U.S.C. §119 or 365 to Great Britain Application No. 0222511.8, filed Sep. 27, 2002.

The present invention relates to an optical correlator and to a method of correlating.

The correlation between two variables is a quantity indicating the closeness of the relationship between two functions. Where two functions can be precisely represented, the relation between them can be determined by an integral known as the correlation integral.

Thus, correlation may be performed computationally, for example in the field of digital signal processing.

In mathematical terms, for an arbitrary first function f(x) and an arbitrary second function g(x), the correlation integral h(x) is set out in equation (1):

$$h(x) = \int_{-\infty}^{\infty} f(u) \times g(x+u)\,du \quad (1)$$

It is convenient, when providing a measure of the similarity between two images, not to form the correlation integral by computation but instead to use Fourier optics. The Fourier transform of the correlation integral is shown in equation (2):

$$F\{h(x)\}=F(s)\times G^*(s) \quad (2)$$

Where F {h(x)} is the Fourier transform of {h(x)}, F(s) and G(s) are the Fourier transforms of f(x) and g(x) respectively and * indicates the complex conjugate.

To explain the term "complex conjugate", a complex number expressed as x+jy (j is the square root of −1), has a complex conjugate given by x−jy.

In the field of optics it is well known that a real (as opposed to virtual) image of the Fourier transform, of an input image is formed using a lens of positive optical power, (in other words a converging lens) at the focal plane of the lens.

It is therefore possible to apply two or more images, typically two images, such as a reference image and a scene image, side-by-side to a positive power lens and to form the Fourier transform of the two images at the focal plane of the positive power lens. Since the two images are processed together by the lens, the power spectrum which is formed is termed the joint power spectrum. By analogy with the above discussion of correlation, if the Fourier transform of the reference and scene images is itself then Fourier transformed to provide a second Fourier transform, for example by application to a further positive power lens, then the second Fourier transform, referred to as the "joint power spectrum"; is indicative of the correlation between the two images. A device employing this technique is the subject of U.S. Pat. No. 5,511,019.

It will be seen that an optical correlator does not involve the complex conjugate: this is because in forming a Fourier transform of light, only the absolute value of light amplitude is used.

Image display devices are usually pixellated. Thus the reference and scene images which are displayed on the image display devices are discontinuous. Now, the mathematical analysis of pixellated systems becomes complicated; however, the correlation results obtained using optical Fourier transforms of pixellated images are still valid.

A number of problems exist with optical correlators.

One problem is that some types of image display device require an appreciable time to load an image. To mitigate this problem the state of the art currently favours the use of ferroelectric liquid crystal devices which are relatively fast.

Other problems relate to the size of correlators in which two successive Fourier optical systems are required to provide two successive Fourier transforms.

The physical size has to some extent been addressed by earlier attempts to build correlators, such earlier attempts using the same Fourier optics for both transforming steps in a dual-pass system. For such devices the Fourier transform of the reference and scene images is obtained. Then the reference and scene image data is removed and the transform is substituted for reference and scene images. The transform then is applied to the Fourier optics. Nonetheless, the length of such a double-pass correlator is relatively large and there is a undesirable spatial separation between image display and image capture devices. The time to produce a valid correlation result includes the length of time taken to read image data to the image production device, the length of time required for sensing the Fourier transform of the input image and the length of time for conveying that Fourier transform information back to the image production device, followed by the length of time again to read that information to the image production device, and the length of time for the image sensing device to sense the second Fourier transformed result. Thus, one of the consequences of the spatial separation between the input image and the Fourier-transformed resultant image is that the length of time taken to provide a correlation result is extended.

Given that ferroelectric liquid crystal devices are normally two-state devices, a time period is also needed for allotting the value "1" or "0" to the captured image data to allow redisplay on the image production device. In the case of a binary phase device the value "1" corresponds to a "+1" phase shift and the value "0" to a "−1" phase shift.

According to a first aspect of the present invention there is provided an optical correlator having an image production device, an image capture device and an optical device for providing a Fourier transform of image information on the image production device at the image capture device, wherein the image production device and image capture device are disposed in a common plane.

The common plane in some embodiments is the focal plane of a curved mirror. In other embodiments the common plane may be the focal plane of a planar mirror with a positive power lens.

By disposing the image production and capture devices locally to one another, the correlation speed of the correlator is increased by comparison with correlators in which the image production and capture devices are mutually remote. The physical size of a correlator having a folded architecture of this sort is less than the prior art correlators.

Preferably, the image production device and the image capture device are integrated on a common substrate.

By providing a common substrate, the operating conditions of the two devices can be made identical. Integration allows manufacturing costs to be minimised, and handling and alignment issues to be addressed.

In one family of embodiments, the image production device has plural image production elements, the image capture device has plural image capture elements and the image production elements and the image capture elements are within the image production elements.

By forming the elements interspersed or intercalated, the optical system does not provide a spatial offset of the image to be captured with respect to the image provided by the image production device. It should be borne in mind that illumination of the image production device is substantially uniform and that where the image production and capture elements are interspersed, the information content of captured light is formed by subtracting the uniform amount from the total incident light.

In a preferred one of this family of embodiments, each image production element includes an image capture element.

The image capture elements may be relatively small by comparison to the image production elements so that a regular array of image production elements each contains an image capture element.

In another family of embodiments, the image production device and the image capture device are spatially separate.

In embodiments where the image production device and image capture device are spatially separate, special optical measures are taken to offset the resultant image from the optical system with respect to the image on the image production device.

Preferably, the correlator comprises at least one positive power optical device arranged to receive light from the image production device and to pass light back to the image capture device.

Advantageously, the positive power optical device comprises a curved mirror.

Alternatively, the positive power optical device comprises a planar mirror and a positive power lens.

Instead of a mirror, a fibre array may be used to 'fold back' the light to the image capture device.

Preferably, the image production device comprises circuitry for applying reference image data to one part of the image production device, and circuitry for providing reference scene data to another distinct part of the image production device.

In one family of embodiments, the image production device provides phase modulation of light in response to displayed image data. In another family of embodiments the image production device provides amplitude modulation of light in response to displayed image data.

Preferably, the image production device has two output levels only.

Advantageously, the image production device comprises a ferroelectric liquid crystal on silicon spatial light modulator (FLCOS SLM).

Alternatively, a nematic liquid crystal on silicon spatial light modulator may be used.

In yet another family of embodiments, a microelectromechanical systems (MEMS) modulator is used.

According to a second aspect to the present invention there is provided a pixellated image capture device for a joint transform correlator, the image capture device being constructed and arranged to provide an electrical signal per pixel representative of the quantity of light received at the pixel wherein the image capture device is integrated on a silicon substrate, and the integrated device further comprises processing circuitry constructed and arranged to compare the electrical signal of each pixel of the image capture device against a threshold, and to provide an output signal per pixel.

Preferably, the threshold is formed from the electrical signals of at least one pixel adjoining the said pixel.

Preferably, the image capture device further comprises a pixellated image production device, and the processing circuitry is constructed and arranged to provide each output signal per pixel to a respective pixel of the image production device.

Preferably, the image capture device further comprises output circuitry for reading out unprocessed information from each pixel.

According to a third aspect to the present invention there is provided a method of correlating at least one input image with at least one reference image, the method comprising illuminating a representation of the or each input image and the or each reference image with coherent light to provide a first light beam; passing the first light beam to an optical device disposed to provide a second image at a plane, the second image being a Fourier transform of the or each input image and reference images; wherein the second image is formed co-planar with the representation of the or each input image and reference image.

According to a fourth aspect of the present invention there is provided an integrated circuit comprising a liquid crystal on silicon spatial light modulator and an image capture device, the spatial light modulator having an array of light modulating elements and the image capture device having an array of light capture elements, wherein each light capture element is arranged to provide an output representative of the light picked up by the respective capture element, the integrated circuit further having processing circuitry for each capture element constructed and arranged to process the output of the said capture element together with the output of at least a respective one other capture element and to provide a first output from each capture element in response to such processing, the capture device further having output circuitry for outputting the unprocessed output of each capture element.

Two embodiments of the invention will now be described with reference to the accompanying drawings in which:—

Figure 7:
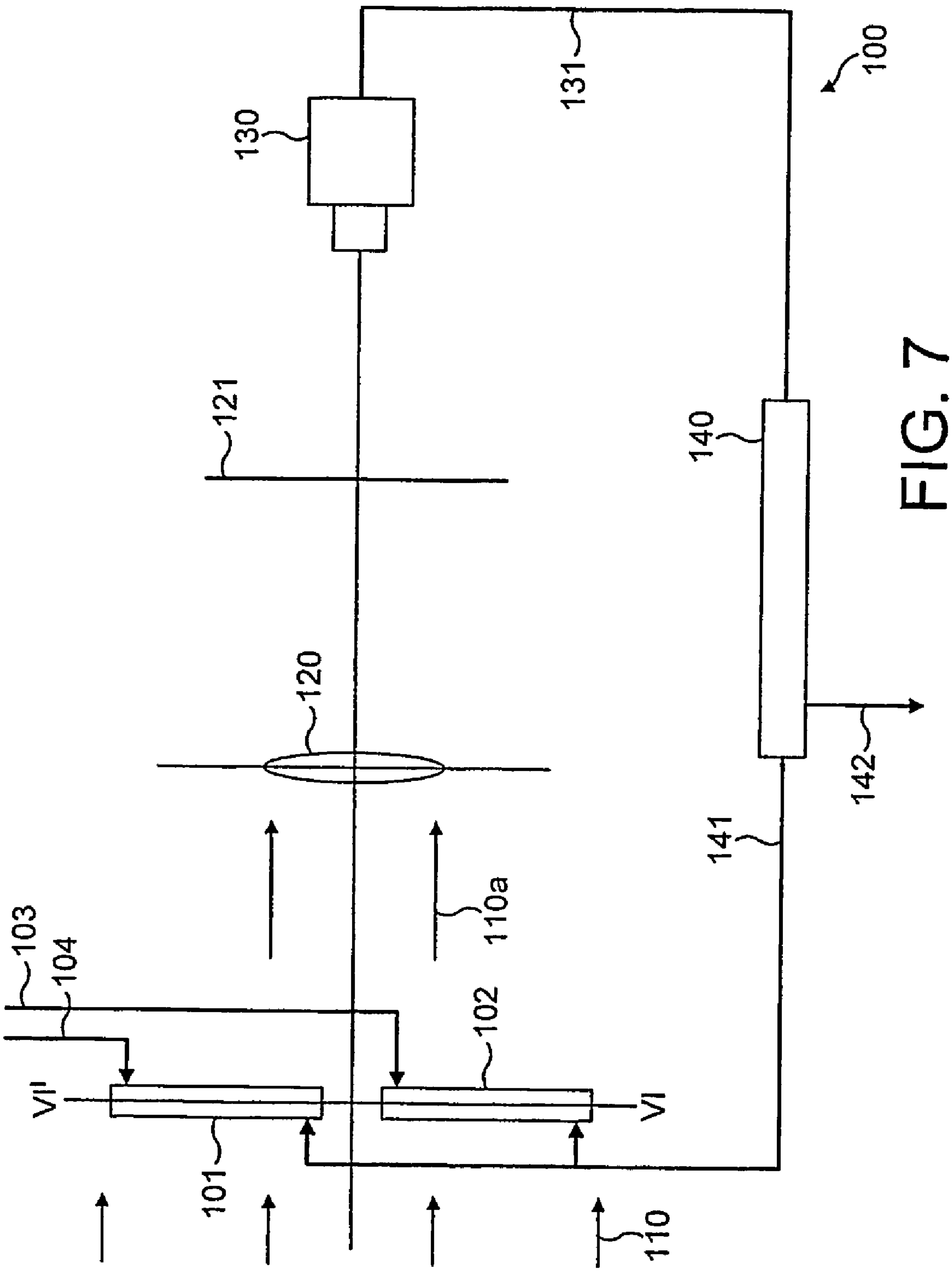

Referring first to FIG. 7 a prior art dual-pass optical correlator 100 operates as a binary phase-only correlator. The correlator 100 has a first SLM 101 and a second SLM 102 arranged side-by-side in a common plane V1-V1'. The correlator 100 has a first input line 104 which is connected for applying a respective input signal to the first SLM 101. A second input line 103 is connected to apply an input signal to the second SLM 101. Reference image information is supplied over the first input 104 to the first SLM 101; scene image data is applied over the second input 103 to the second SLM 102.

The SLMs 101,102 are transparent and are illuminated from one side, as shown in the diagram the left-hand side, by collimated laser light 110. The light passes into the SLMs 101, 102 and emerges as light 110*a*, modified by the phase shifts imparted by the SLMs 101,102. The SLMs 101, 102 are pixellated and each pixel is binary; thus it is only able to provide a selected one of two possible phase shifts to light passing through that pixel. Hence the light 110*a* consists of spatially distinct beams of collimated light having a first or second phase shift with respect to the incident light 110. The beam 110*a* is incident on a Fourier converging leps 120 which has a screen 121 in its focal plane. The screen 121 displays the joint Fourier transform of the reference and scene images. An image capture device 130 such as CCD camera 130 is disposed behind the screen 121 to capture the Fourier image data on the screen 121. The capture device 130 has an output 131 to a processing device 140. The processing device 140 has a first output 141 which forms a second input to the SLMs 101, 102. The processing device 140 also has a second output 142.

The joint Fourier transform data picked up by the capture device 130 is applied to the processor 140. The image on the screen 121 resulting from the application of the reference and scene images at the lens 120 is an analog interference pattern. Information derived from this pattern is to be applied to the binary SLMs 101,102 for a second pass, and hence it is necessary to decide which of the binary levels is represented at each pixel of captured data. To do this, the processor 140 allots to each of the pixels a brightness value of 1 or 0 according to some pre-established criterion. The output 141 of the processor 140 conveys the binary information to the SLMs 101, 102. There the information is substituted for the reference and scene image information as new image data. Light 110 is then applied to the new image data displayed on the SLMs 101, 102. Again the light is passed through the Fourier lens 120 to be incident on the screen 121. The capture device 130 picks up the image data which now represents the correlation between the two original input images, namely the reference and scene images originally applied to the SLMs 101, 102. The correlation data typically consists of two non-central bright spots symmetrical about the centre and a central bright spot. The central bright spot is the zero-order, i.e. undiffracted content, of the joint power spectrum. For the purpose of determining the cross-correlation of the two original images, the zero-order may be regarded as unwanted. It may of course be useful in other respects.

The data picked up by the capture device 130 is applied again to the processor 140 which processes the image to extract information from the non-central peaks, outputting this information over the second output 142 as the desired correlation data.

Figure 1:
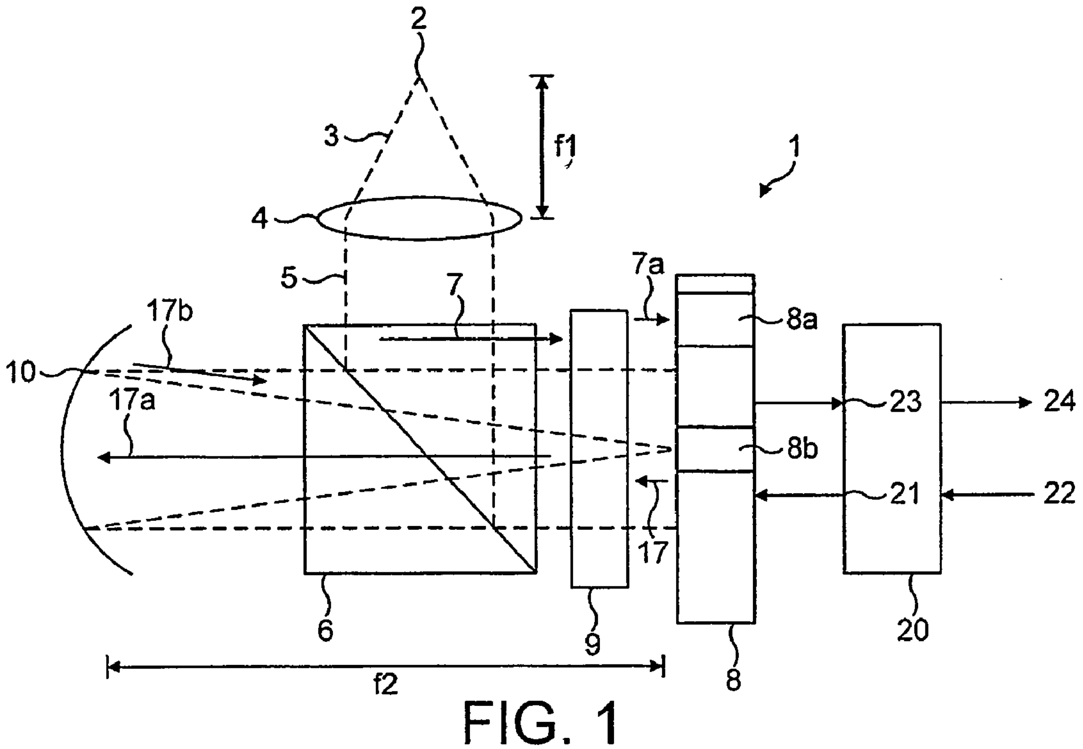
FIG. 1 shows a block schematic diagram of a first optical joint transform correlator embodying the present invention.

Referring now to FIG. 1, a joint transform correlator 1 receives laser light from an optical fibre 2 launched into free-space so as to provide a divergent beam 3. The divergent beam 3 is incident upon a collimating lens 4 disposed so that its focal point is coincident with the end of the fibre 2. Other methods of launching coherent light may be substituted for the arrangement shown.

The collimating lens 4 provides a parallel beam 5 which is incident on a beamsplitter 6 here a polarising beamsplitter, although this is not essential. The polarising beamsplitter 6 is disposed to divert the incident light via 90 degrees to provide a beam of light 7 towards an image production and capture device 8 having an image production portion 8*a* and an image capture portion 8*b* arranged in a common plane. The image production and capture device 8 in this embodiment is a combined ferroelectric liquid crystal spatial light modulator (FLCSLM) 8*a* and CMOS smart pixel sensor array 8*b*, further described herein with respect to FIGS. 3, 4 and 5. Between the polarising beamsplitter 6 and the device 8 there is a half-wave plate 9 which changes the direction of polarisation of light 7 to output light 7*a* which is incident on the image production and capture device 8 for alignment with the liquid crystal to inject the liquid crystal axis for binary phase.

The image production portion 8*a* is pixellated, and as will be later described with respect to FIG. 2, has an optically-transparent front electrode 204. In this embodiment, the front electrode 204 is substantially continuous across the whole of the image production and capture device 8. The front electrode 204 is disposed over a ferroelectric liquid crystal layer 203, which is in turn disposed over a reflective aluminium layer 202. The pixels of the image production portion 8*a* are driven to display a information from a reference image r and a scene image s, the two images being side-by-side and provided in phase terms. That is to say, the data of a binary (black and white) image is formed into counterpart first and second values of phase shift.

The image production and capture device 8 may alternatively be in line with the fibre 2, i.e. beneath the beamsplitter 6. In a further embodiment, image production and capture devices 8 are in both locations. In such an embodiment, the laser light may have two wavelength and filters be disposed in front of each image production and capture device 8.

Light 7*a* passes into the spatial light modulator through the transparent electrode 204. The phase of the light 7*a* is changed by the in-plane tilt of the ferroelectric liquid crystal layer 203 within the pixel of concern. The light 7*a* is reflected by the aluminium electrodes 202 and passes again through the liquid crystal layer 203 and through the transparent electrode 204 to emerge as exiting light 17. The exiting light 17 is shifted in phase with respect to the incident light 7*a* by either a first amount, or a second amount depending on the voltage between the front electrode 204 and the aluminium electrodes 202. The exiting light 17 passes again through the half-wave plate 9 and is incident on the polarising beamsplitter 6. Due to the effects of the half-wave plate 9, the majority of the light 17 passes straight through the polarising beamsplitter 6 to emerge as light 17*a*. The light 17*a* is incident on the reflecting face of a concave curved mirror 10 which has a focal length $f_2$ and is located such that its focal plane is at the plane of the image production and capture device 8. Thus, collimated light 17*a* which is incident on the curved mirror 10 is reflected back as reflected light 17*b* to the image production and capture device 8 as a focussed image. The distribution of light 17*b* across the image production and capture device 8 is an interference pattern indicative of the Fourier transform of image data provided by the image production portion 8*a*.

The correlator 1 further includes a processing unit 20 which has a first output 21 for loading into the pixellated ferroelectric liquid crystal SLM portion 8*a*, two images that are disposed side by sided across the SLM, one image representative of the reference image and the other representative of the scene image which is to be correlated with the reference image. The processing unit 20 receives the reference and scene image data r,s at a first input 22. It also has a second input 23 for receiving data from the pixels of the image capture portion 8*b*, and a second output 24 at which correlation data are made available.

In the present embodiment the device 8 contains circuitry 500 (see FIG. 6) for allotting binary values to the light levels received at the pixels of the image capture portion 8*b*, and for applying those binary values to the pixels of the image production portion 8*a*. The circuitry 500 in this embodiment consists of clocked and gated comparison circuitry. The comparison circuitry 500 compares the amount of input light at each pixel with the averaged magnitude of light at the four nearest-neighbour pixels. The output 330 of the comparison circuitry 500 provides a '1' if the light at the pixel is greater, and a '0' if smaller than the averaged light magnitude of the nearest neighbour pixels. The circuitry output per pixel is thus said to be binarised. The binarised data is connected via a gating circuit (not shown) to the corresponding pixel of the image production portion 8*a* of the device 8.

By forming the comparison circuitry 200 on-chip, the signal transfer times, and thus time delays, are reduced. By providing one comparator per pixel, the comparison operations can be carried out substantially simultaneously and in parallel. This is very time-efficient.

The image data from the binarised results is then passed through the Fourier optics, and the reflected and collected data at the pixels of the image capture portion 8*b* is read out. The data this time is not passed to the comparator circuitry 200 but instead is passed to the second input 23 of the processing unit 20. Read-out is typically by a capacitor transfer system similar to a BBD so that the input to the processing unit 20 is bit-serial.

In this embodiment the ferroelectric liquid crystal SLM is a 256×256 pixel device, although other sizes and geometries are possible.

Figure 3:
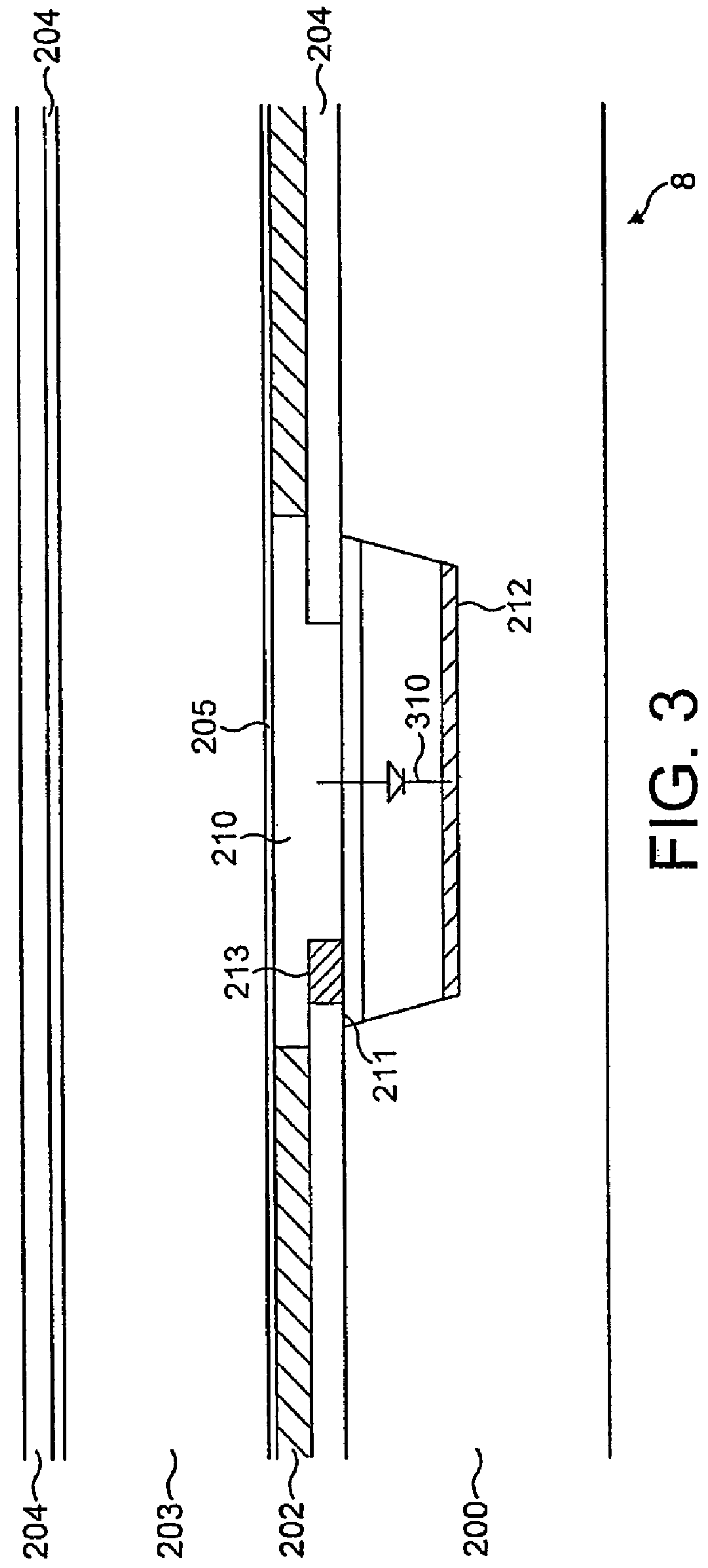
FIG. 3 shows a diagrammatic cross-sectional view through the image production and capture device of FIG. 1.

Referring now to FIG. 3, the device 8 consists of a silicon wafer 250 with a circuitry portion 200 on its surface. On the circuitry portion 200 is an oxide layer 201 on its surface. On the oxide layer is the aluminium reflective electrode layer 202. This layer 202 defines the pixels of the image production portion 8*a*. As shown in FIG. 4*b* the aluminium electrodes 202 are substantially square but with a square 302 excised from the corresponding corner of each pixel. Returning to FIG. 3, the excised square 302 forms a window 210 through which access is available to the underlying substrate wherein there is disposed a photodiode 220. Over the aluminium electrodes 202 there is disposed an alignment layer 205 and, over the alignment layer 205, there is disposed a liquid crystal 203 which extends substantially across the entirety of the SLM. Above the liquid crystal layer 203 there is a second alignment layer 206 and on top of the second alignment layer 206 is a transparent electrode 204. The transparent electrode may be ITO or any other known transparent electrode material. A spin-on glass coating or other encapsulating or covering material (not shown) is disposed over the transparent electrode layer 204.

The circuitry portion 200 is n-type and has, in the region of the window 210, (which it will be understood form a regular array across the substrate) a p-dopant heavily implanted into it to form a shallow implanted region 211. A rear n+ region 212 is implanted in the window area 210 to act as the rear electrode of the photodiode. A front diode electrode 213 is implanted in the window adjacent the edge of the oxide 201 to form the anode of the diode. The rear electrode 212 which forms the cathode and the front electrode 213 are connected to circuitry (not shown) disposed within the circuitry portion 200, for example disposed under the aluminium electrodes 202 via metal or polysilicon conductors.

The image capture device 8*a*, as discussed above, captures the joint power spectrum $|R+S|^2$ of the two images. The joint power spectrum is defined by equation 3:

$$|R+S|^2=R^*S+S^*R+R^2+S^2 \quad (3)$$

where R is the Fourier transform of the reference imager, S is the Fourier transform of the scene images to be correlated with the reference image.

In this relation, the terms R*S and S*R form desired and symmetrical correlation terms that appear in the output. The terms $R^2$ and $S^2$ relate to the zero-order output which appears as a undiffracted central bright spot.

The processing unit 20 receives the data from the pixels and generates correlation data from that data by extracting the zero-order bright spot, and computing values from the brightness and the separation of the correlation peaks in the image data.

Figure 4A:
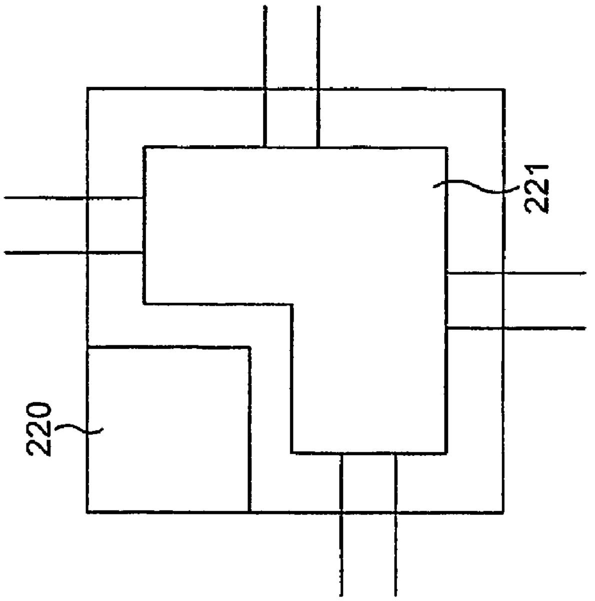
FIG. 4 shows elevations of a pixel of the device of FIG. 3.
Figure 4B:
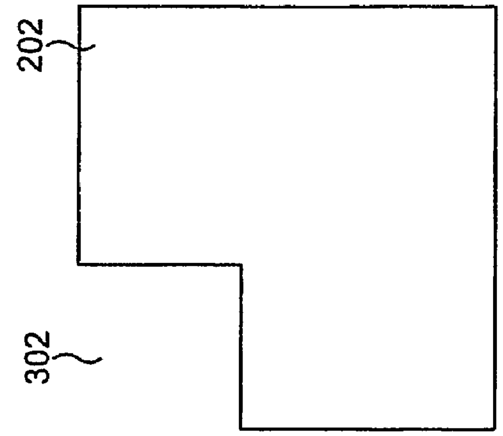
Figure 4C:
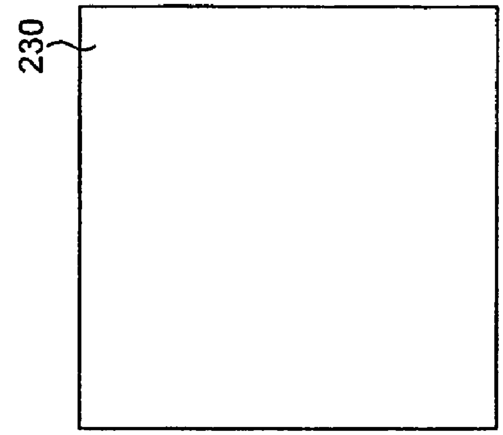
Figure 5:
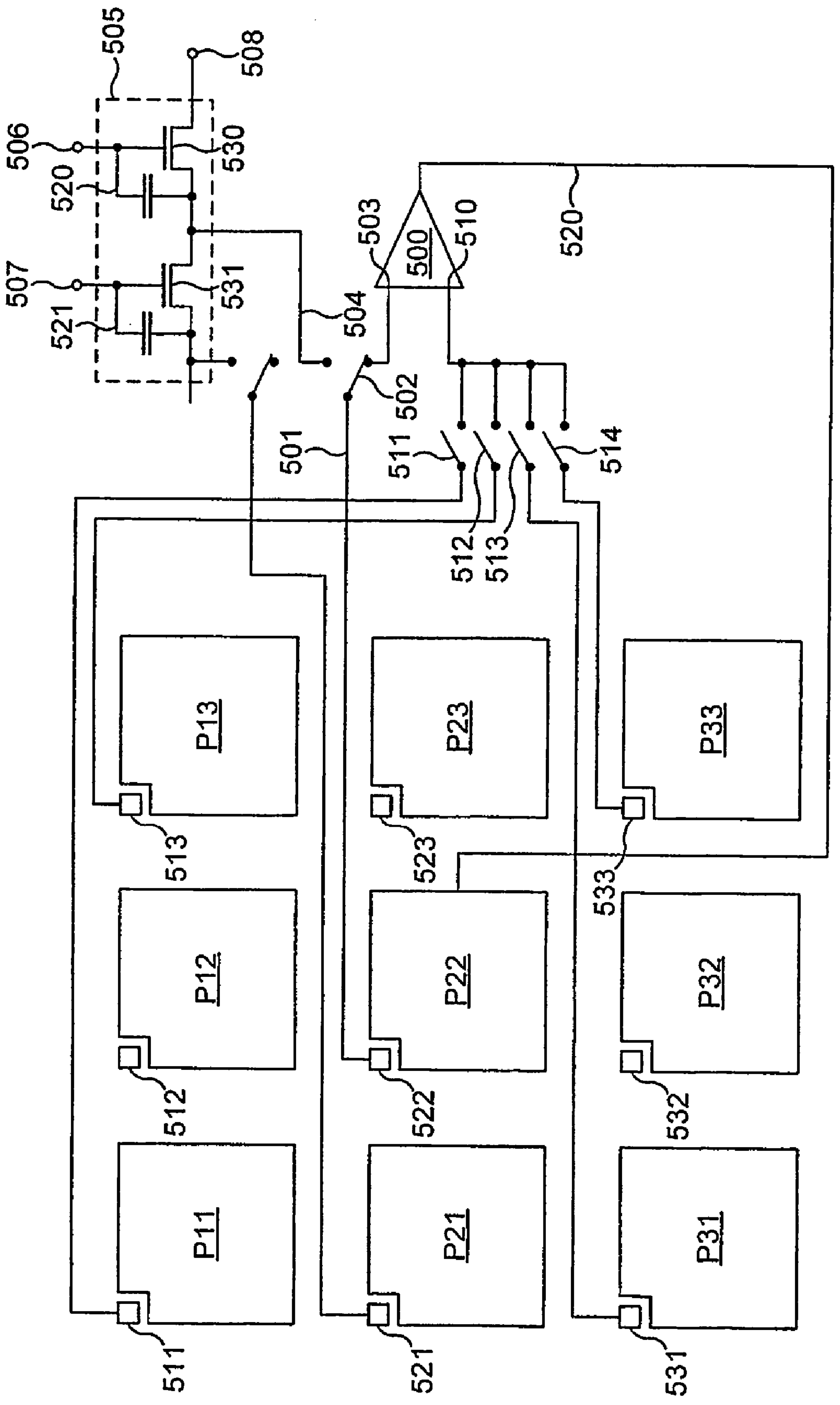
FIG. 5 shows a block schematic diagram of a part or an image production and capture device for use in the invention, incorporating processing and output circuitry.

Referring to FIG. 4, a portion of an image production and capture device 8 comprises nine pixels P11-P33 of image production elements and an array of nine image capture sensor devices S11-S33. As shown, and as described with respect to FIG. 3, the capture devices are within a cut-out portion of the production devices P11-P33.

Although in this embodiment the sensor devices S11-S33 are interspersed within the production devices P11-P33, the same principles will apply if the image production device and the image capture device are separately disposed on the same substrate.

The present description relates to the image production device P22 and the image capture device S22. It will be understood that similar circuitry will be provided for each and every other one of the pixels of the image production and capture device 8 which may have, as previously described, 65K pixels.

For the pixel P22, S22 there is provided a comparator circuit 500 having two inputs 503, 510. The first input 503 is connectable via a switch 502 to the line 501 from the image capture sensor S22. The second input 510 of the comparator 500 is connected to the sensors S11, S13, S31 and S33 which are the nearest-neighbouring pixels to the pixel S22, P22. The connection to the second input 510 is via switches 511, 512, 513, 514. The switch 502 connected to line 501 may be switched over to an alternative connection in which the line 501 is connected to a charge transfer device 505 of which only a portion is shown.

The output 520 of the comparator 500 is connected to the pixel P22 of the image production device.

The comparator 500 is arranged to compare the potential at first input 503 with the average of the potentials at the sensors S11, S13, S31 and S33. To do this, the switches 511-514 are closed and the comparator then provides a logical one output at the output 520 if the first input 503 is above one quarter the potential at the second input 510. Thus, provided the light input at the capture device S22 is greater than the average of the light at the capture devices S11, S13, S31 and S33 then the output 520 will be at logical one. In all other conditions the output 520 will be at logic zero. Comparators may be provided which operate using current or which operate using voltage, as will be described with respects to FIG. 6.

In use therefore when the first Fourier transform has been formed on the image production and capture device 8, the connection of the switch 502 will be as shown. The result is that the comparator 500 which is on the same substrate as the other components, will provide an output directly to the image production pixel P22 and all of the comparator circuits for each pixel will perform the same (non-destructive) comparison.

Once the first Fourier transform has been formed and the binarised data provided to the image production pixels, then the image capture pixels will receive the joint power spectrum which is required to provide the correlation result. The correlation results are processed off chip and to that end the switch 502 is switched to its second position where it connects to the input line 504 to the charge transfer device 505. The charge transfer device has two clock inputs 506, 507 and operates in a form analogous to a bucket brigade device so that once a capacitor 520, 521 is charged up to the potential provided by an associated capture device S22, suitable clock pulses provided to the clock terminals 506, 507 cause the associated transistors 530, 531 to clock-out a series of analogue voltages to the output terminal 508. The analogue voltages correspond to the sensors arranged in a row of the image production and capture device 8. After outputting the bit-serial voltages, these are processed as required to provide the relevant information.

Figure 6:
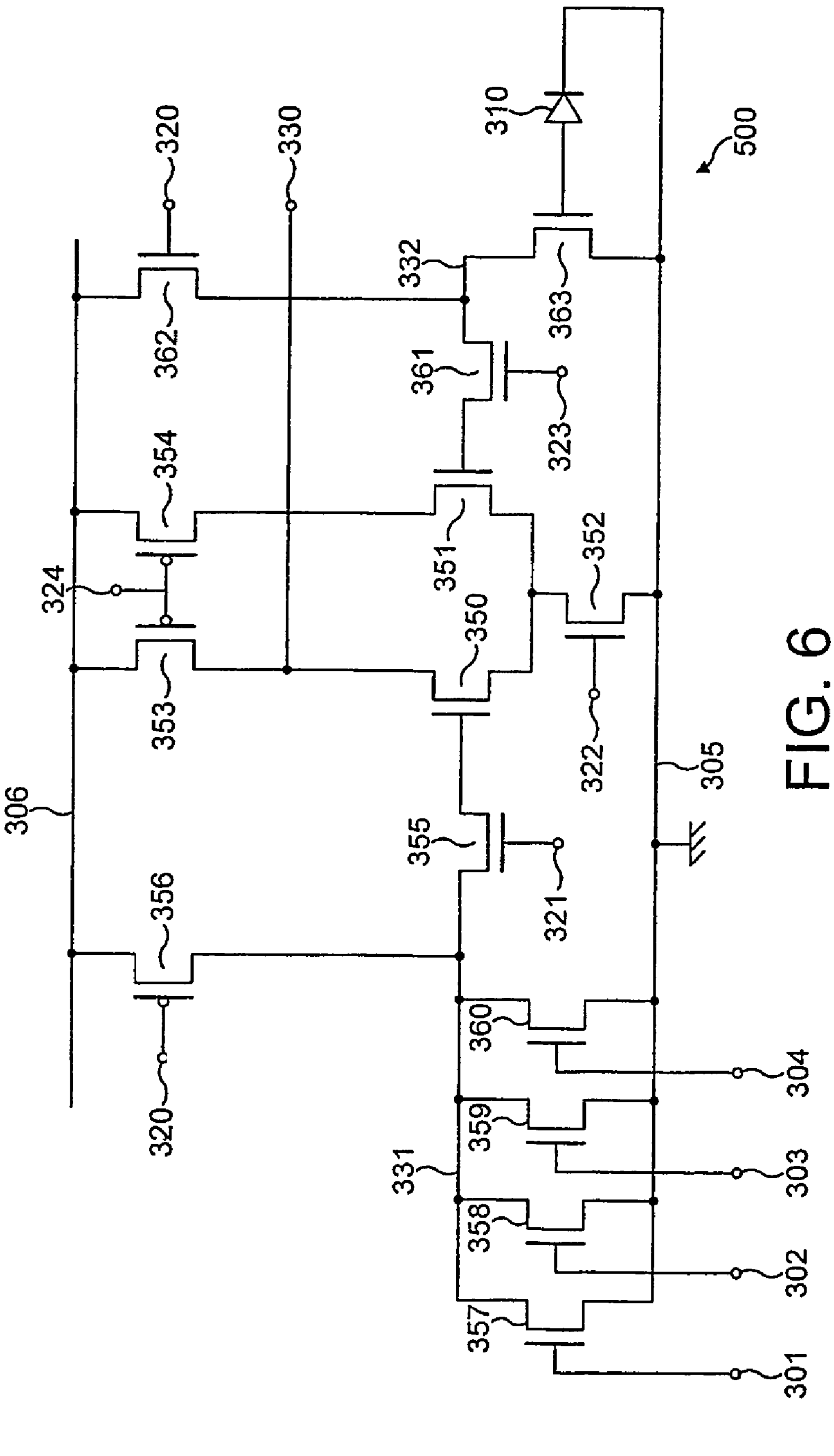
FIG. 6 shows a schematic diagram of processing circuitry of the device of FIG. 3; and, FIG. 7 shows a block schematic diagram of a known optical joint transform correlator.

Referring now to FIG. 6, a comparator circuit 500 compares the output voltage from a photodiode 310 of a pixel with the corresponding output voltages of the four nearest pixels, such voltages being supplied to four input nodes 301-304 of the circuit 500. The comparator 500 is a clocked device and has six clock inputs 320-324. The comparator circuit 500 has an output node 330. The structure of the comparator 500 will now be described.

The comparator circuit 500 comprises a source-coupled pair of nFETs 350, 351. The common sources of the nFETs 350, 351 are connected to reference potential 305 via the drain-source path of a current source NFET 352. The drain of the first NFET 350 is connected to a positive supply 306 via the drain-source path of a first pFET 353 and the drain of the second NFET 351 is connected to the positive supply 306 via the drain-source path of a second pFET 354. The first NFET is connected to a first line 331 via a transmission gate FET 355 controlled at it gate via the second clock input 321. The first input line 331 is connected to the positive supply 306 via a first p-type pre-charge FET 356 and to the negative supply 306 via four quarter-size n-type pull-down FETs 357-360. The quarter size n-type pull-down FETs each receive at its gate one of the neighbouring pixel inputs 301-304. The second n-type FET 351 is connected to a second input line 332 via a transmission gate FET 361 whose control electrode is provided by the third clock input 323. The second input line 332 is connected to the positive supply 306 via a second p-type pull-up FET 362 whose gate is connected to the first clock input 320. The second input line 332 is connected to the reference 305 via a fifth pull-down FET 363 of unit size, the gate of the fifth pull-down FET 363 being connected to the photodiode 310.

The operation of the comparator 500 will now be described.

Prior to any sensing operation, the clock inputs 320-323 are taken low so as to turn off the transmission gates 355 and 361 and to turn on the pre-charge transistors 356, 362. The result is that the capacitance of the lines 331 and 332 are pre-charged towards the positive supply potential. As the pull-up FET 356, 362 are of identical size and provided the capacitance of the lines 331, 332 are the same, the same amount of charge will be stored on the two lines. Measures may be needed to ensure that the capacitance of the two lines 331, 332 are the same.

During this pre-charge interval, the photodiode 310 and the photodiode of the nearest neighbouring pixels are un-illuminated and, as a result, the transistors 357-60 and 363 remain off.

At a given time instant the clock inputs 320 are taken high, thus turning off the pull-up transistors 356, 362. At this time illumination is applied to the photodiode 310 and the photodiodes of the neighbouring pixels so that the line 331 and the line 332 are pulled down towards the reference potential 305. If all of the photodiodes receives the same amount of illumination, lines 331 and 332 will drop at the same rate. This is because the transistors 357-360 are one quarter the size of transistor 363. However, if the light applied to photodiode 310 is greater than the average of the light applied to the photodiodes connected to terminals 301-304, then the line 332 will be pulled down more rapidly than the line 331. After a given time has elapsed, the clock voltages applied to nodes 321 and 323 are taken high at the same time as the clock voltage applied to nodes 324 and 322. This has the effect of connecting the lines 331 and 332 to the gates of transistors 350 and 351. As the common source electrodes of the transistors 350 and 351 are taken towards the negative supply by the action of transistor 352, one of the two transistors 350 and 351 turns on and the other turns off, according to the respective gate voltages applied. As a result, if the second line 332 is at a lower potential than the first line 331, then the transistor 350 will turn on and provide a low potential at output node 330. If instead the first output line 331 is at a lower potential than the second line 332, then the transistor 350 remains off and the transistor 351 turns on. The result is that the output node 330 remains at the logic high state.

Figure 2:
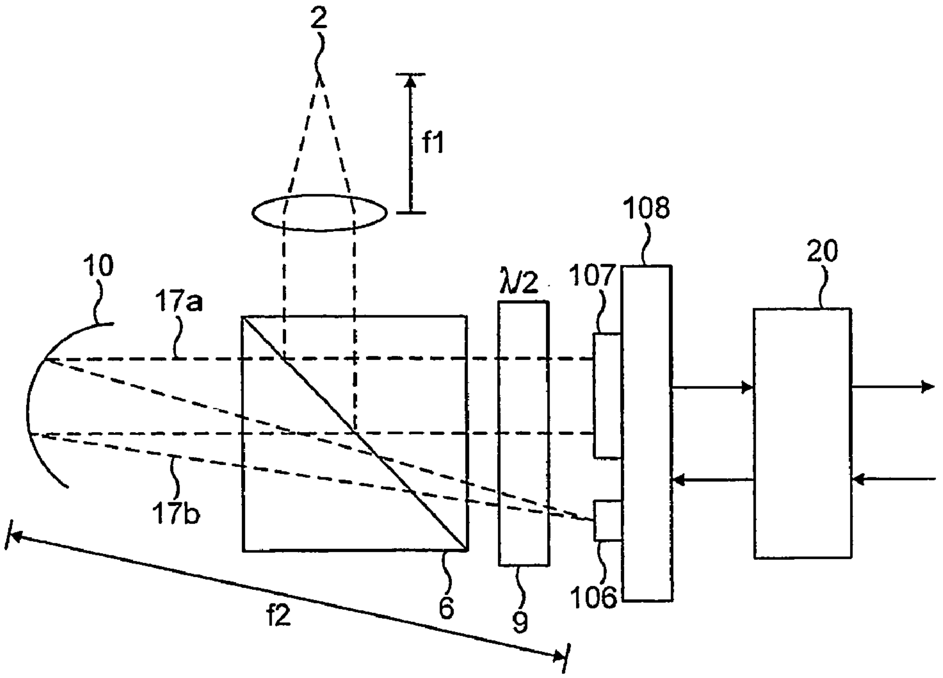
FIG. 2 shows a block schematic diagram of a second optical joint transform correlator embodying the present invention.

An alternative correlator 500 is shown in FIG. 2. Here, the image production and capture device 8 of FIG. 1 is replaced by an integrated circuit 108 which has an FLC SLM portion 107 and a spatially separate image capture portion 106. The image capture portion 106 and the image production portion 107 are disposed on the same face of the device 108. The image capture portion 106 is disposed beyond the image production portion 107 and to the side of it. The curved mirror 10 is tilted off the axis of the beamsplitter 6 so that the resulting Fourier Transform is produced at the image capture portion 106. This allows the FLCSLM and CMOS sensor to be separate but integrated on the same substrate. It is alternatively possible for the FLC SLM 107 and the sensor 106 to be discrete units.

Separating the FLC SLM 107 and the sensor 106 decreases the complexity. The CMOS sensor 106 contains smart pixel technology to perform the binarisation process of the captured joint power spectrum.

Embodiments of the present invention have been described with particular reference to the examples illustrated. However, it will be appreciated that variations and modifications may be made to the examples described within the scope of the present invention

The invention claimed is:

1. An optical correlator having an image production device, an image capture device and an optical device for providing a Fourier transform of a joint image on the image production device at the image capture device, wherein the image production device and image capture device are disposed in a common plane that is perpendicular to a direction of light incident thereon, the optical correlator further having circuitry for applying reference image data and scene image data to the image production device so that scene and reference image data are displayed side-by-side as the joint image, and the optical device is disposed to receive light from the joint image thereby to form a joint power spectrum from the joint image at the image capture device.

2. The optical correlator of claim 1, wherein the image production device and the image capture device are integrated on a common substrate.

3. The optical correlator according to claim 1, wherein the image production device has plural image production elements, the image capture device has plural image capture elements and the image capture elements are interspersed with the image production elements.

4. The optical correlator of claim 1, wherein the image production device has plural image production elements, the image capture device has plural image capture elements and each image production element includes an image capture element.

5. The optical correlator of claim 1, wherein the image production device and the image capture device are spatially separate.

6. The optical correlator of claim 1, wherein the optical device comprises at least one positive power optical device arranged to receive light from the image production device and to pass light back to the image capture device.

7. The optical correlator of claim 6, wherein the positive power optical device comprises a curved mirror.

8. The optical correlator of claim 6, wherein the positive power optical device comprises a planar mirror and a positive power lens.

9. The optical correlator of claim 1, having circuitry for applying reference image data to one part of the image production device, and circuitry for providing reference scene data to another distinct part of the image production device.

10. The optical correlator of claim 1, wherein the image production device is operable to provide phase modulation of incident light according to applied image data.

11. The optical correlator of claim 1, wherein the image production device has two output levels only.

12. The optical correlator of claim 1, wherein the image production device comprises a ferroelectric liquid crystal on silicon spatial light modulator.

13. The optical correlator of claim 1, wherein the image production device comprises one from the group comprising a nematic liquid crystal on silicon spatial light modulator, a pi-cell spatial light modulator and a microelectromechanical systems (MEMS) spatial light modulator.

14. A joint transform correlator in which a reference image and a scene image are displayed side-by-side as a joint image, and light therefrom is Fourier transformed to provide a distribution indicative of a Fourier transform of the joint image on an image capture device, the image capture device being constructed and arranged to provide an electrical signal per pixel representative of a quantity of light received at the pixel wherein the image capture device is integrated on a silicon substrate, and the integrated device further comprises processing circuitry constructed and arranged to compare the electrical signal of each pixel of the image capture device against a threshold, and to provide an output signal per pixel in accordance with the comparison result, the integrated device further comprising a pixellated image production device integrated on the same substrate as the image capture device, wherein the processing circuitry is constructed and arranged to provide each output signal per pixel to a respective pixel of the image production device.

15. The joint transform correlator of claim 14, wherein the threshold is formed from the electrical signals of at least one pixel adjoining the said pixel.

16. The joint transform correlator of claim 14, having output circuitry for reading out unprocessed information from each pixel of the image capture device.

17. A method of correlating an input image with a reference image, the method comprising:

illuminating a joint representation of the input image and the reference image with coherent light to provide a first light beam; and, passing the first light beam to an optical device disposed to provide a second image at a plane, the second image being a Fourier transform of the joint representation of the input image and reference image, wherein the second image is formed co-planar with the joint representation of the input image and reference image.

18. An integrated circuit comprising a liquid crystal on silicon spatial light modulator and an image capture device, the spatial light modulator having an array of light modulating elements and the image capture device having an array of light capture elements, wherein the spatial light modulator is arranged to provide reference image data and scene image data displayed side-by-side as a joint image, and each light capture element is arranged to provide an output representative of a Fourier transform of the joint image picked up by the respective capture element, the integrated circuit further having processing circuitry for each capture element constructed and arranged to process the output of the capture element together with the output of at least a respective one other capture element and to provide a first output from each capture element in response to such processing, the capture array further having output circuitry for outputting the unprocessed output of each capture element.

* * * * *